United States Patent [19]

Vitaloni

[11] 4,387,292
[45] Jun. 7, 1983

[54] ELECTRIC LIGHTER FOR MOTOR VEHICLES AND THE LIKE

[75] Inventor: Alberto Vitaloni, Turin, Italy

[73] Assignee: Squirrel S.p.A., Cambiano, Italy

[21] Appl. No.: 329,474

[22] Filed: Dec. 10, 1981

[30] Foreign Application Priority Data

Dec. 15, 1980 [IT] Italy ............................. 68907 A/80
Jul. 31, 1981 [IT] Italy ......................... 53514 B/81[U]

[51] Int. Cl.³ .............................................. F23Q 7/22
[52] U.S. Cl. .................................. 219/267; 219/261; 219/265; 219/270; 361/264
[58] Field of Search ............... 219/260, 261, 262, 263, 219/264, 265, 266, 267, 268, 269, 270, 386, 533, 219/552; 361/264, 265, 266

[56] References Cited

U.S. PATENT DOCUMENTS 2,275,922  3/1942  Rayburn ............................. 219/267
2,528,500  11/1950 Davis ................................. 219/261
2,993,977  7/1961  Balaguer ............................ 219/270
3,125,662  3/1964  Alvarez et al. ................... 219/270 X
3,351,736  11/1967 Jacobson ............................ 219/267
3,356,826  12/1967 Krautwurst et al. ............... 219/267
3,383,494  5/1968  Hubert ............................... 219/265
4,255,645  3/1981  Vitaloni ............................. 219/267

Primary Examiner—Volodymyr Y. Mayewsky
Attorney, Agent, or Firm—Sughrue, Mion, Zinn, Macpeak and Seas

[57] ABSTRACT

The electrical resistance hot-plate of the plug of the lighter comprises a holder which houses and retains a heating element in the form of a metal strip shaped, for example, in accordion-pleated folds or a coil, so as to have consecutive turns which together define respective flat faces at the two opposing edges of the strip, at least one of which is so situated in correspondence with an open side of the holder for receiving the tip of a cigarette. The consecutive turns of the strip are spaced apart so as to define a plurality of interstices, and the holder has at least one opening opposite its open side to expose a greater part of the corresponding flat face of the heating element and allow a flow of air from one face of the element to the other.

14 Claims, 8 Drawing Figures

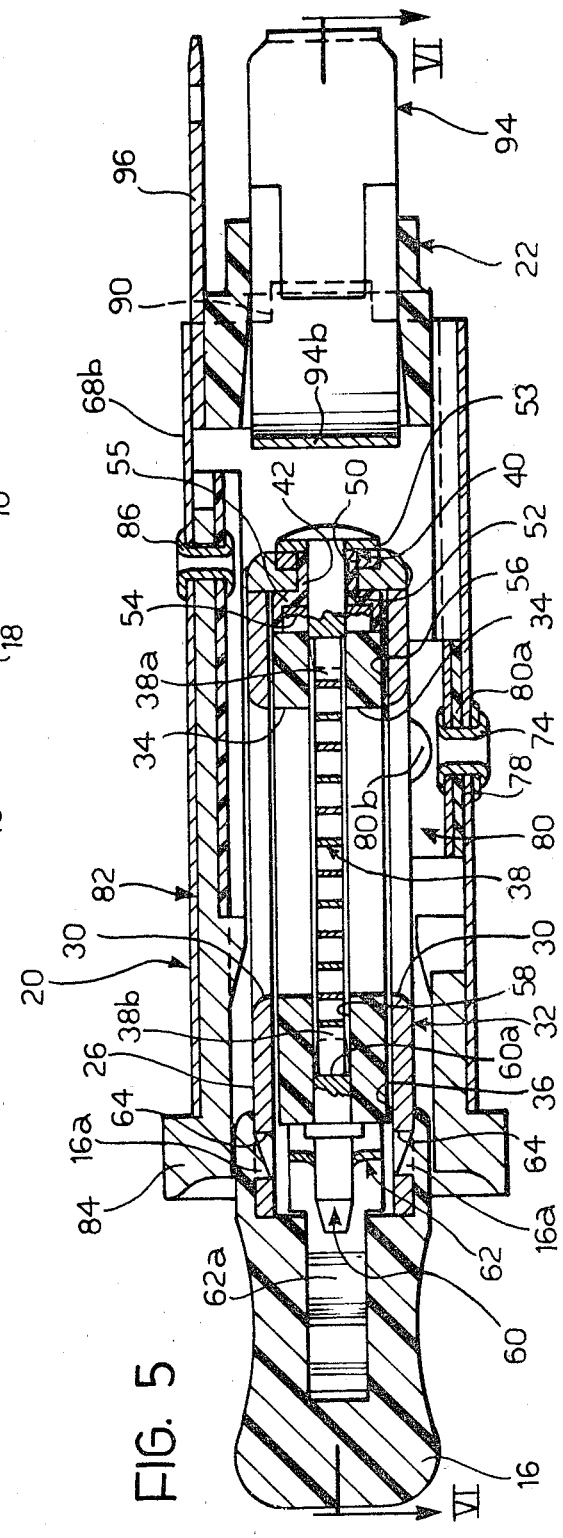
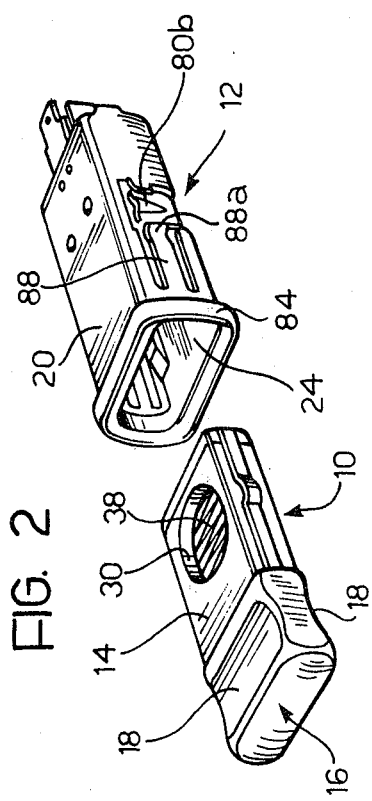
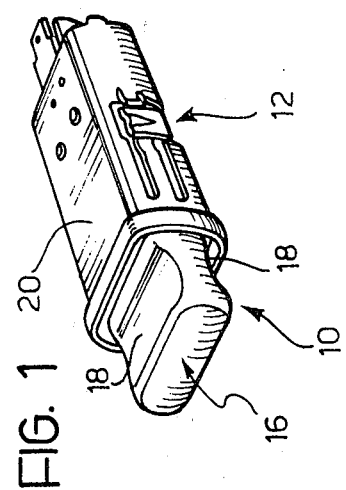

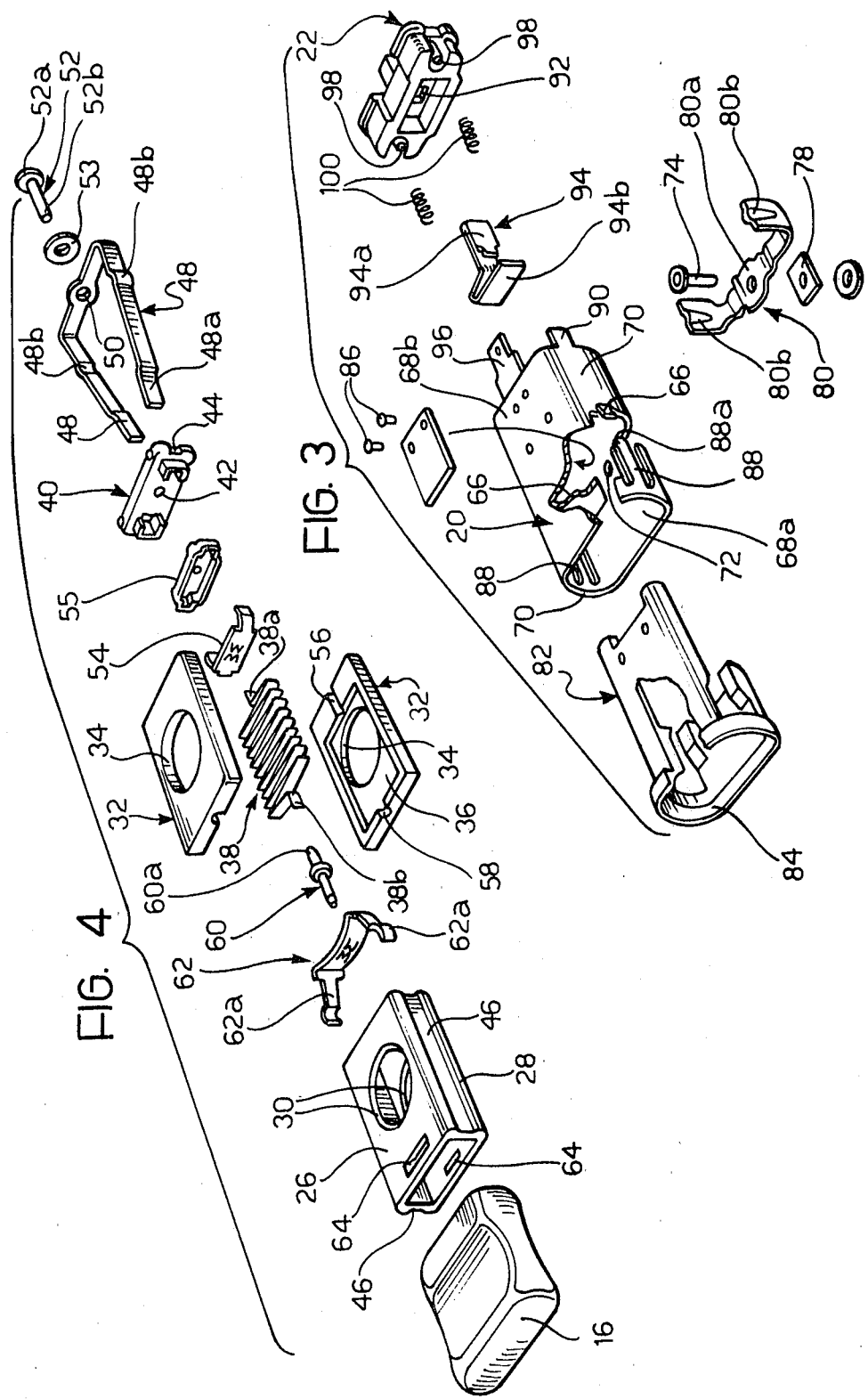

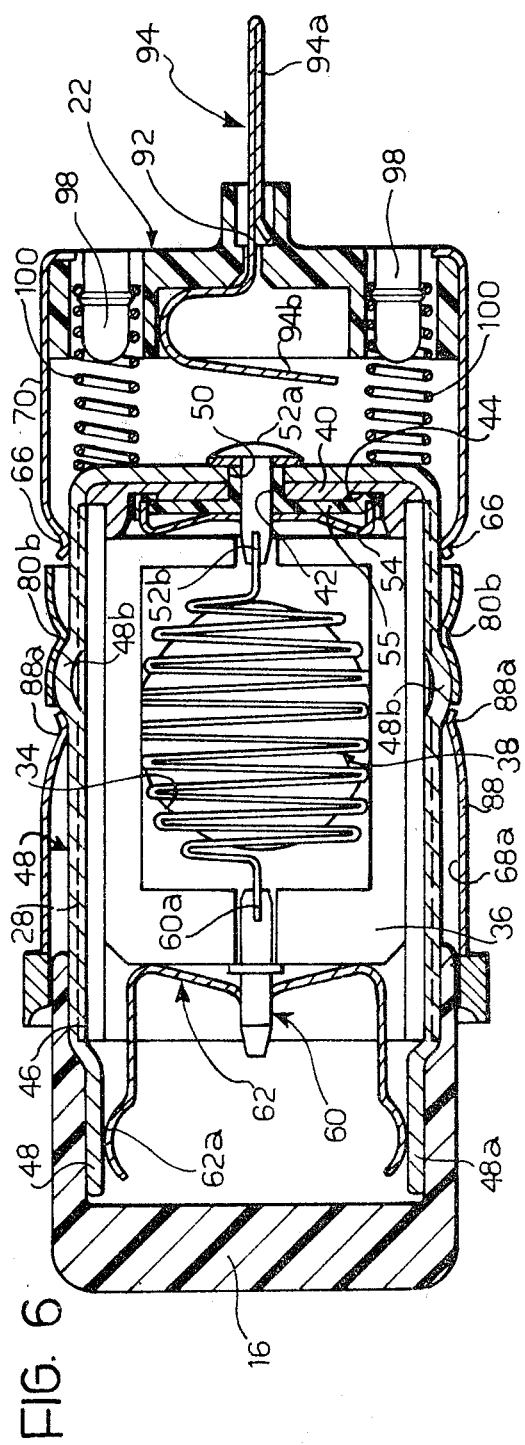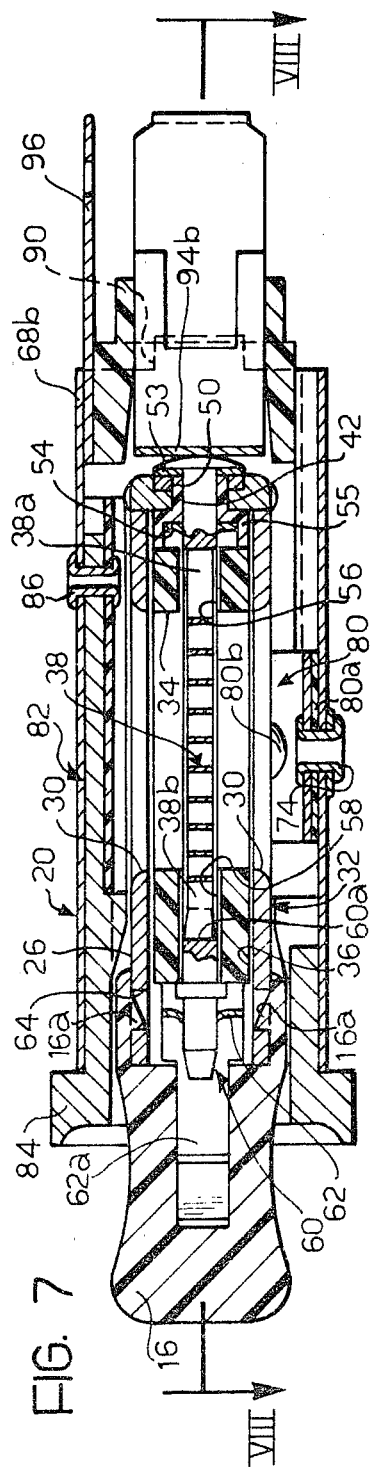

ELECTRIC LIGHTER FOR MOTOR VEHICLES AND THE LIKE

The present invention relates to an electric lighter, of the type comprising a hot-plate incorporated in an elongate tubular body of a plug which is removable from a receiving sleeve fixed to a mounting wall, such as the dashboard of a vehicle, in which the hot-plate comprises a holder which houses and retains a heating element in the form of an electrically-resistive metal strip shaped so as to have consecutive turns which together define respective flat faces at the two opposing edges of the strip, one of which is an active face located in correspondence with an open side of the holder for receiving the tip of a cigarette.

Numerous designs of electric lighters of the aforesaid type are known, in which the holder is defined by a metal peripheral wall and a base of heat-resistant, electrically-insulating material such as, for example, steatite. The holder houses a coiled metal strip with turns which are very close together.

Known lighters of this type sometimes give rise to difficulties in lighting a cigarette since, as a result of the contact when the tip of the cigarette is applied, and sometimes pressed, against the active face of the heating element which has become red hot, there is an absence of oxygen in this area of contact and a consequent difficulty in igniting the tobacco. Moreover, particles of carbonised tobacco may become embedded between the turns, forming short-circuits between one turn and the next. Removal of ash and carbonised particles from a known coil-type heating element is anything but a simple operation.

Because of the aforesaid disadvantages (the lack of oxygen and the presence of ash and carbonised particles) the known coil-type heating elements are given a high thermal capacity, so that they will remain red hot, as necessary for lighting a cigarette, for a fairly long time, taking account not only of the interval between the time when the heating element ceases to be energised and the moment when the smoker applies the heating element to the cigarette, but also of an interval corresponding to several consecutive inhalations by the smoker, since the first inhalation is often not sufficient to start proper combustion of the tobacco.

The higher the thermal capacity of a heating element, the greater is its consumption of electric power, while in a battery-powered system, such as that of a motor vehicle, every saving of electric power is valuable.

The main object of this present invention is to provide an electric lighter of the type mentioned initially, in which the aforesaid disadvantages will be virtually eliminated or at least greatly reduced.

According to the present invention this object is achieved by a lighter of the aforesaid type which is characterized in that the consecutive turns of the metal strip are spaced apart so as to define a plurality of interstices, and the holder has at least one opening opposite its open side so as to expose a greater part of the corresponding flat face of the heating element and allow a flow of air from one face of the heating element to the other.

By virtue of this solution, every time the smoker lights a cigarette, by placing its tip against the active face of the heating element which has been brought to red heat, he causes air to be drawn through the interstices of the heating element at each inhalation, with corresponding improvement in oxygenation. Cleaning of the heating element is also made easier, since the user can clear away the ashes and carbonised particles simply by blowing through the heating element by mouth or, if necessary, with a jet of compressed air.

Further characteristics and advantages of the invention will become apparent from reading the detailed description which follows by way of non-limiting example, with reference to the accompanying drawings, in which:

FIG. 1 is a perspective view of a cigarette lighter, with its plug inserted in its sleeve;

FIG. 2 is a similar perspective view, with the plug removed from the sleeve;

FIG. 3 is an exploded perspective view of the sleeve;

FIG. 4 is an exploded perspective view of the plug;

FIG. 5 is a longitudinal section of the lighter with the plug inserted in the sleeve and in its rest position;

FIG. 6 is a longitudinal section along the line VI—VI of FIG. 5, also with the plug in the rest position;

FIG. 7 is a longitudinal section similar to FIG. 5, with the plug in the position in which its heating element is supplied.

Figure 8:
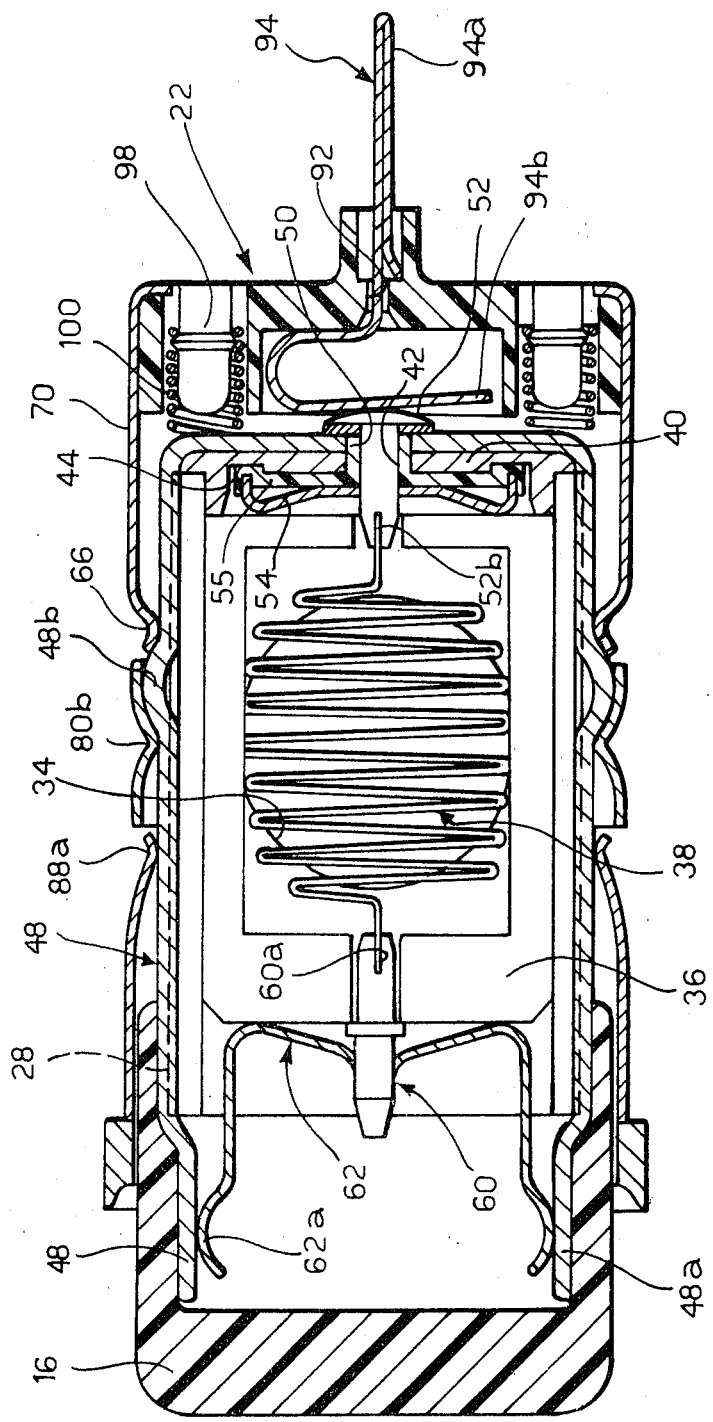
FIG. 8 is a longitudinal section, similar to FIG. 6, along the line VIII—VIII of FIG. 5, again with the plug in the heating element supply position.

Referring to FIGS. 1 and 2, an electric cigarette lighter comprises a plug, generally indicated 10, and a sleeve, generally indicated 12.

The plug 10 consists essentially of a hollow metal body 14 of rectangular, flattened parallelepipedal shape, and a gripping handle 16 with a flattened shape corresponding to that of the body 14, which is fixed to one end thereof in a manner explained later.

The handle 16 has opposing indented parts 18 for the fingers to grip.

The sleeve 12 consist essentially of a metal tubular element 20 which is also flattened in shape, and an end wall 22 (FIGS. 3 to 8) of an insulating material, such as moulded plastics.

Internally, the sleeve 20 defines a housing 24 with a cross-section corresponding to that of the body 14, for receiving the latter.

Referring to FIGS. 4 to 8, as well as FIG. 2, the body 14 of the plug 10 is in the form of a flattened metal sleeve with two larger, opposing, longitudinal flat faces 26 and two opposing sides 28. Respective aligned circular openings or windows 30 are made in the larger faces 26.

Two matching plates 32 of steatite or equivalent material are fitted into the sleeve 14. Each plate has a circular opening 34 which, when it is inserted into the sleeve 14, coincides with the respective opening or window 30 in the latter.

The sides of the plates 32 which face one another are formed with respective seats 36 which, when the plates are put together, define a deep seating or undercut rebate around the opening 34. This seating is also indicated 36.

The two plates 32 form a holder for a heating element 38 in the form of an accordion-pleat folded metal strip with spaced-apart limbs. The two ends 38a, 38b of the strip 38 extend longitudinally in opposite directions. The terminal connecting folds of the "turns" of the strip are confined in the seating 36.

The end of the sleeve 14 opposite that to which the handle 16 is fixed is closed by a metal end wall 40. This wall 40 has a central through-hole 42 and a groove 44 on its outer face. The sides 28 of the sleeve 14 also have longitudinal grooves 46. These grooves 44, 46 accommodate a U-shaped lamellar metal element 48 which acts as a "strap" for the sleeve 14 and the end wall 40.

The yoke of the element 48 has a central hole 50, and into the holes 50, 42 is fitted a small pin 52, with a head 52a, which is insulated from the strap element 48 and the sleeve 14 by means of a washer 53 and an insert 54. The small pin 52 is forced into a hole in a sprung retaining plate 55 and extends through a hole defined by opposing semi-circular grooves 56 in the plates 32. The hole thus defined is indicated by the same reference 56.

The end of the pin 52 opposite the head 52a has a diametral slot or split 52b in which the end 38a of the resistive strip 38 is tightly pinched.

The two plates 32 also have respective facing semicircular grooves 58, defining a hole 58, at the ends facing the handle 16. Into this hole, extends the shank of a small pin 60 which also has, at its end within the seating 36, a diametral slot or split 60a in which the other end 38b of the resistive strip 38 is tightly pinches. The yoke of another U-shaped lamellar metal element 62, with two shaped, sprung arms 62a, is fitted onto the pin 60 by resilient clamping.

The strap element 48 has free ends 48a which, when the element is housed in the grooves 44, 46 and embraces the sleeve 14, project from the end of the sleeve to which the handle 16 is connected. The sprung arms 62a are in resilient contact with the ends 48a, through which they establish an electrical connection between the end 38b of the heating element 38 and the strap element 48.

The handle 16, which is of moulded plastics material, is in the form of a cap and is fitted closely on to the corresponding end of the sleeve 14, where it is retained by the snap engagement of its inner teeth 16a into respective transverse slots or grooves 64 in the sleeve 14.

The two arms of the strap element 48 have respective raised engagement portions 48b which project from the sides 28 of the sleeve 14 for a positioning function which will be described below, as well as for effecting a good sliding electrical contact with the inner surfaces of the sides of the tubular element 20 of the sleeve 12.

The head 52a of the pin 52 constitutes a frontal central contact stud for the electrical connection of the other end 38a of the resistive strip 38, as will be explained below.

Referring to FIGS. 1 to 3 and 5 to 8, the metal tubular part 20 of the sleeve 12 has a pair of slots 66 which extend from one of its larger faces 68a to its sides 70. The other larger face 68b of the element 20 is not slotted. Between the two slots 66 is a bridge 72, with a hole, to which the yoke of a bimetallic gripper 80 is fixed by a rivet 74, with the interpositioning of a heat insulating plate 76. This yoke is indicated 80a. The yoke 80a extends transversely of the larger face 68a of the housing 24, and the two sprung jaws 80b of the gripper 80 lie between the slots 66, which allow their ventilation.

An insert 82 is disposed in the tubular element 20 and serves as an effective guide for the sleeve 14 of the plug 10, and moreover defines the mouth 84 of the sleeve. Preferably, the insert 82 is made from die-cast metal. It is fixed to the tubular element 20 by means of rivets 86.

Respective opposing spring blades 88 are formed by cutting the sides 70 of the tubular element 20, which is made from sheet metal, and their free ends 88a are shaped so as to constitute a pair of spring pawls positioned to interfere with the raised engagement portions 48b of the strap element 48. The spring pawls 88a are in a position situated longitudinally between the mouth 84 and the sprung jaws 80b of the bimetallic gripper 80.

The sprung jaws 80b are also in a position to interfere with the raised engagement portions 48b, for a purpose which will be explained later.

The insulating end wall 22 is inserted into the end of the tubular element 20 opposite the mouth 84, where it is retained by seamed tongues 90 of the element 20.

The wall element 22 has a central slot 92 through which is forced an arm 94a of a contact blade 94. The arm 94a projects outwardly from the end wall element 22 and constitutes a terminal pin for connection with an electrical system (usually to the positive pole of a motor vehicle battery). The other connection terminal, also consisting of a flat pin, is an earth contact 96 formed on the tubular element 20.

The contact blade element 94 has a sprung frontal flange 94b against which the contact stud 52b is engageable.

The end wall element 22 also has a pair of laterally opposing conical posts 98 onto which are fitted the ends of respective helical springs 100 constituting resilient repulsion means for the plug 10, as will be seen.

The cigarette lighter just described operates as follows.

When the plug 10 is inserted in the sleeve 12 in its rest position (FIGS. 5 and 6), the raised engagement portions 48b are located between the spring pawls 88a and the jaws 80b. The pawls 88a prevent the plug 10 from accidentally slipping out of the sleeve 12, whilst the jaws 80b of the gripper 80 prevent the plug 10 from moving into the position in which the heating element 38 is supplied.

When the user wishes to light a cigarette, he pushes the handle 16 like a button, and the raised portions 48b move the jaws 80b of the gripper apart to pass over its central rib 80c so that the plug 10 reaches the position shown in FIGS. 7 and 8, compressing the repulsion springs 100. In this position, the contact stud 52b is in firm resilient engagement with the sprung flange 94b of the contact element 94 and current is supplied to the end 38b of the heating element 38. The other end 38a of the element is already earthed by resilient engagement, amongst other things, of the spring pawls 88a with the arms of the strap element 48. Thus, the heating element 38 is supplied and becomes red hot. In the supply position of FIGS. 7 and 8, one or other of the pairs of openings 30, 34 faces the yoke 80a of the gripper 80 and the heating element therefore heats the latter, causing progressive widening apart of its jaws 80b. As soon as the jaws 80b are sufficiently wide apart, the repulsion springs 100 thrust the plug 10 back to the rest position of FIGS. 5 and 6, and the plug 10 can be withdrawn for use by grasping the handle 16 with the thumb and forefinger in the indentations 18.

It should be noted that, in the lighter according to the present invention, the gripper 80 does not form part of the electric circuit, so that the contact between the raised portions 48b and jaws 80b in the rest position has no effect on the heating element 38.

Once the plug 10 is withdrawn, the user can light the cigarette held in his mouth by applying its tip to either of the active faces of the heating element 38, which are accessible through one or other of the windows 30.

The fact that the limbs of the resistive strip 38 are spaced apart gives the heating element the form of a grating, which not only encourages the drawing of air, and hence ensures lighting of the cigarette, but also prevents the deposition of ash and dirt on the heating element itself.

As will be appreciated, a lighter like that described and illustrated has an extremely simple structure and is of a very small size, so that the sleeve 12 will occupy very little space on the dashboard of a motor vehicle and the plug 10 will be light, easy to handle, and of an "ergonomic" type. This means that, if the sleeve 12 is fixed in a motor vehicle dashboard, the user, after having withdrawn the plug 10 from it, has only to effect a 90° rotation of his arm in order to bring one of the active faces of the heating element 38 against the tip of the cigarette, instead of 180° arm movement which is necessary with conventional lighters with a frontal heating element.

In a lighter like that described and illustrated, the plug 10 does not have moving parts which are, however, present in conventional lighters, wherein an electrical resistance hot plate of the frontal or lateral type is carried by a device which slides relative to the body of the plug, so as to allow engagement of the electrical resistance hot plate between the jaws of a bimetallic gripper which also acts as an electrical connection contact for the resistance. Known plugs of this type, through the presence of the sliding device and its respective return spring, are cumbersome and do not lend themselves to being made in a small size, particularly "slim-line", as would be desirable in the light of modern trends.

The presence of only static elements in the plug of the lighter according to the invention, allows a "slim-line" embodiment.

I claim:

1. An electric lighter of the type including: a receiving sleeve; a plug housed in the sleeve and comprising an elongate tubular body with a handle at one end to allow its removal from the sleeve, and hot-plate means incorporated in the plug, said hot-plate means comprising a holder with an open side and a heating element housed in said holder, said heating element comprising an electrically-resistive metal strip shaped so as to have consecutive turns which together define respective flat faces at the two opposing edges of the strip, said strip being an accordion-pleat folded strip one of said faces being an active face located in correspondence with the open side of the holder to receive the tip of a cigarette, wherein the improvement consists in the consecutive turns of said strip being spaced apart so as to define a plurality of interstices, and the holder having at least one opening opposite its open side to expose a greater part of the corresponding flat face of the heating element and allow a flow of air from one face of the element to the other.

2. A lighter as defined in claim 1, wherein said holder is housed in said tubular body of said plug in such a manner that the active face of the heating element faces the tubular wall of said body, and wherein said tubular wall defines a window for access of cigarettes to the active face of the heating element.

3. A lighter as defined in claim 1, wherein both flat faces of said heating element are active faces and said holder is supported in said tubular body of the plug in such a manner that the opposing active faces of the heating element face opposite parts of the tubular wall of the body, and wherein said opposite parts define respective windows for access of cigarettes to the respective active face of the heating element.

4. A lighter as defined in any one of claims 1 to 3, wherein said tubular body of the plug is in the form of a flattened sleeve with opposing larger surfaces which define said windows, wherein two matching plates of steatite are inserted in said sleeve, each said plate defining an opening which corresponds with the window of the adjacent larger surfaces of the body, and wherein said plates define between them a seating in the form of a rebate which is undercut relative to the openings, the accordion-pleat folded strip being embedded in the rebate and being accessible through the corresponding windows and openings.

5. A lighter as defined in claim 1, wherein:
the tubular body of the plug has a flattened form with two larger opposing longitudinal surfaces defining respective windows, and two opposing sides;
the sleeve defines a housing for receiving the body of the plug, said housing having a cross-sectional shape corresponding to that of the hollow body, with two larger opposing longitudinal surfaces and two opposing sides;
the heating element is fixed in the body and has opposing active faces accessible through the respective windows in the larger surfaces of the body;
the body has transversely opposite raised engagement ridges located one on each of its sides;
a gripper is provided having a yoke which extends transversely of one of the larger faces of the housing and sprung jaws which extend over the sides of the housing in a position of interference with the raised engagement portions;
the sleeve has a pair of spring retainers located on respective sides of the housing in positions of interference with the raised engagement portion, the position being longitudinally between the mouth of the sleeve and the jaws of the gripper, and the arrangement being such as to define a stable rest position for the plug in which its body is inserted in the sleeve and the raised engagement portions are located between the retainers and the jaws, and a heating element supply position in which the body of the plug is inserted further into the sleeve, the raised engagement portions are retained by the jaws, one of the windows of the body faces the gripper yoke, and respective electrical contacts of the plug and the sleeve are mutually engaged, and resilient repulsion means are provided at the end of the sleeve opposite the mouth, said means being frontally engageable with the body of the plug in the supply position so as to urge the plug into the rest position when the jaws of the gripper move apart due to the heat of the heating element.

6. A lighter as defined in claim 5, wherein the body of the plug is metal and the sleeve consists essentially of a metal tubular element, said body and said element constituting a first pair of electrical contacts which cooperate to supply the heating element, and wherein a second pair of electrical contacts are constituted by a stud carried centrally by the body of the plug so as to be insulated from the end of the body opposite to the handle, and a frontal spring contact carried, with insulation, on an end wall of the sleeve.

7. A lighter as defined in claim 6, wherein the spring retainers comprise blades formed by cutting the tubular element of the sleeve.

8. A lighter as defined in claim 5, wherein the repulsion means comprise at least one helical spring which is carried by an end wall of the sleeve and is compressible by the body of the plug when the latter is in the supply position.

9. A lighter as defined in claim 6, wherein the metal body of the plug is in the form of a flattened sleeve with an end wall at the opposite end to the handle; two matching plates of steatite or similar material, are inserted in said sleeve, each plate having an opening corresponding to the window of the adjacent larger surface of the body, and the two plates defining between them a seating in the form of a rebate which is undercut relative to the openings, and wherein the heating element comprises an accordion-pleat folded metal strip embedded in the seating and accessible through the corresponding windows and the openings.

10. A lighter as defined in claim 9, wherein one end of the metal strip in the rebate is directed towards the end wall of the body and the other is directed towards the handle, the ends being closely fitted into slots made in respective pins, one pin having a head which constitutes said central contact and the other serving to fix a blade element for electrical connection with the body.

11. A lighter as defined in claim 10, wherein the end wall and the side walls of the body have grooves which house a U-shaped lamellar metal strap element, the arms of which are made with the raised engagement portions, and which, being insulated, is retained by the pin with the head which consitutes said central contact, the ends of the U-shaped element projecting from the end of the body to which the handle is connected, and wherein said blade element comprises a U-shaped spring element with a yoke which is fixed by the respective pin and arms which are resiliently engaged with the projecting ends of the strap element.

12. A lighter as defined in claim 11, wherein the handle is in the form of a flattened cap of plastics material which is fitted on to the corresponding end of the body to cover the ends of the strap element and the arms of the spring blade element, and is fixed to the body by means of snap-engageable coupling.

13. A lighter as defined in any one of claims 5 to 12, wherein the body of the plug has a substantially rectangular flattened parallepipedal shape, and the handle has a corresponding flattened form, with indented parts for a user's fingers to grasp.

14. A lighter as defined in any one of claims 5 to 12, wherein the windows of the body of the plug are circular.

* * * * *